United States Patent
Ma et al.

(10) Patent No.: US 10,445,103 B2
(45) Date of Patent: Oct. 15, 2019

(54) MOBILE GAME DATA PROCESSING METHOD AND APPARATUS

(71) Applicant: TENCENT TECHNOLOGY (SHENZHEN) COMPANY LIMITED, Shenzhen (CN)

(72) Inventors: Liang Ma, Shenzhen (CN); Zhiqiang He, Shenzhen (CN); Chunhua Luo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 82 days.

(21) Appl. No.: 15/714,225

(22) Filed: Sep. 25, 2017

(65) Prior Publication Data
US 2018/0018178 A1 Jan. 18, 2018

Related U.S. Application Data

(63) Continuation of application No. PCT/CN2016/083157, filed on May 24, 2016.

(30) Foreign Application Priority Data

Nov. 17, 2015 (CN) .......................... 2015 1 0791150

(51) Int. Cl.
*G06F 9/44* (2018.01)
*A63F 13/25* (2014.01)
(Continued)

(52) U.S. Cl.
CPC ................ *G06F 9/44* (2013.01); *A63F 13/25* (2014.09); *A63F 13/358* (2014.09); *H04L 67/38* (2013.01)

(58) Field of Classification Search
None
See application file for complete search history.

(56) References Cited

U.S. PATENT DOCUMENTS 9,866,450 B2 * 1/2018 Box ...................... G06F 9/5077
9,934,064 B2 * 4/2018 Kekeh ..................... G06F 9/485
(Continued)

FOREIGN PATENT DOCUMENTS

CN 102460524 A 5/2012
CN 103731340 A 4/2014
(Continued)

OTHER PUBLICATIONS

The World Intellectual Property Organization (WIPO) International Search Report for PCT/CN2016/083157 dated Sep. 1, 2016 5 Pages (including translation).
(Continued)

*Primary Examiner* — Ronald Laneau
(74) *Attorney, Agent, or Firm* — Anova Law Group, PLLC

(57) ABSTRACT

The present disclosure provides a mobile game data processing method and apparatus. The method includes: acquiring a target running state, currently triggered for execution, of a mobile game; searching at least one to-be-processed data operation involved in the target running state; and determining, when the at least one to-be-processed data operation has a to-be-processed data operation of a non-transmission type, the to-be-processed data operation of a non-transmission type as a first data operation, and executing the first data operation at a local client of the mobile game; wherein the first data operation includes an operation of displaying interface association information, the interface association information including at least one of progress information, associated animation information, and operation result information. Thus, a waste of network band-
(Continued)

widths can be avoided during a mobile game, to improve network smoothness of the mobile game.

19 Claims, 6 Drawing Sheets

(51) Int. Cl.
*A63F 13/358* (2014.01)
*H04L 29/06* (2006.01)

(56) References Cited

U.S. PATENT DOCUMENTS

| | | | |
|---|---|---|---|
| 10,142,406 B2* | 11/2018 | Suryanarayanan | ... H04L 67/101 |
| 2006/0103656 A1 | 5/2006 | Blanco et al. | |
| 2006/0259579 A1 | 11/2006 | Beverly | |
| 2010/0115334 A1* | 5/2010 | Malleck | ......... G06F 9/485 714/15 |
| 2010/0257544 A1* | 10/2010 | Kleban | ......... G06F 9/485 719/320 |
| 2011/0310011 A1 | 12/2011 | McDevitt et al. | |
| 2012/0167117 A1* | 6/2012 | Kekeh | ......... G06F 9/485 719/318 |

FOREIGN PATENT DOCUMENTS

| | | |
|---|---|---|
| CN | 105050671 A | 11/2015 |
| CN | 105468358 A | 4/2016 |
| JP | 2014092810 A | 5/2014 |
| JP | 2014161722 A | 9/2014 |
| JP | 2015153176 A | 8/2015 |

OTHER PUBLICATIONS

The State Intellectual Property Office of the People's Republic of China (SIPO) Office Action 1 for 201510791150.3 dated Mar. 25, 2019 8 Pages (including translation).

Anonymous, "Tour play open development in the service business end and customer households end of the sub-station", Mar. 27, 2015, Retrieved from the Internet: URL: https://wenku.baidu.com/view/af68dc465727a5e9856a619b.html, pp. 1-7 14 Pages (including translation).

The Japan Patent Office (JPO) Non-Final Office Action 1 for Application No. 2017-558652 dated Mar. 4, 2019 15 Pages (including translation).

* cited by examiner

MOBILE GAME DATA PROCESSING METHOD AND APPARATUS

RELATED APPLICATION

This application is a continuation application of PCT Patent Application No. PCT/CN2016/083157, filed on May 24, 2016, which claims priority to Chinese Patent Application No. 201510791150.3, entitled "MOBILE GAME DATA PROCESSING METHOD AND APPARATUS" filed on Nov. 17, 2015, the entire content of both of which is incorporated herein by reference.

FIELD OF THE TECHNOLOGY

The present disclosure relates to the field of Internet technologies and, in particular, to a mobile game data processing method and apparatus.

BACKGROUND OF THE DISCLOSURE

With popularization of smart phones, mobile games become increasingly popular. A current network architecture of mobile games generally is that a server is connected to multiple clients. That is, a server can exchange game data with multiple clients. For example, if n clients are to play a mobile game at the same time, the server may mutually transmit game data of the n clients in real time, so that each client can understand game data of other clients and the n clients can achieve an effect of playing a game online at the same time.

The current network architecture of mobile games requires the server to understand each step performed by each client in real time. That is, each client needs to feed back each game step performed to the server, so that the server can instruct the client to perform next operation according to the step fed back by the client. However, according to the present disclosure, some steps that can be judged and processed by the client itself can be notified by the server to the client for execution only after information exchange with the server. It is thus clear that such information exchange is redundant. When a large number of clients play a mobile game at the same time, lots of redundant information exchange may definitely occur at the same time, resulting in that some network bandwidths are occupied by the redundant information exchange, and causing a waste of network bandwidths, which even may affect network smoothness of the mobile game.

SUMMARY

Embodiments of the present invention provide a mobile game data processing method and apparatus, which may avoid a waste of network bandwidths during a mobile game, to improve network smoothness of the mobile game.

In one aspect, the present disclosure provides a mobile game data processing method, including: acquiring a target running state, currently triggered for execution, of a mobile game; searching at least one to-be-processed data operation involved in the target running state; and determining, when the at least one to-be-processed data operation has a to-be-processed data operation of a non-transmission type, the to-be-processed data operation of a non-transmission type as a first data operation, and executing the first data operation at a local client of the mobile game; wherein the first data operation includes an operation of displaying interface association information, the interface association information including at least one of progress information, associated animation information, and operation result information.

In another aspect, the present disclosure provides a mobile game data processing apparatus, including a memory that stores computer executable program code; and a processor configured to execute the computer executable program code in the memory and configured for: acquiring a target running state, currently triggered for execution, of a mobile game; searching at least one to-be-processed data operation involved in the target running state; and determining, when the at least one to-be-processed data operation has a to-be-processed data operation of a non-transmission type, the to-be-processed data operation of a non-transmission type as a first data operation, and executing the first data operation at a local client of the mobile game; wherein the first data operation comprises an operation of displaying interface association information, the interface association information comprising at least one of progress information, associated animation information, and operation result information.

In another aspect, the present disclosure provides a non-transitory computer-readable storage medium, storing computer executable program code for, when executed by a processor, performing a mobile game data processing method, the method comprising: acquiring a target running state, currently triggered for execution, of a mobile game; searching at least one to-be-processed data operation involved in the target running state; and determining, when the at least one to-be-processed data operation has a to-be-processed data operation of a non-transmission type, the to-be-processed data operation of a non-transmission type as a first data operation, and executing the first data operation at a local client of the mobile game; wherein the first data operation comprises an operation of displaying interface association information, the interface association information comprising at least one of progress information, associated animation information, and operation result information.

The embodiments of the present invention, by acquiring a target running state of a mobile game and searching at least one to-be-processed data operation involved in the target running state, can determine, when the at least one to-be-processed data operation has a to-be-processed data operation of a non-transmission type, the to-be-processed data operation of a non-transmission type as a first data operation, and execute the first data operation at a local client of the mobile game. It is thus clear that a client may analyze a target running state to judge a current operation that can be executed locally, so that the client can perform a first data operation at a local client without exchanging information with a server, which avoids redundant information exchange, thereby avoiding a waste of network bandwidths, and improves network smoothness of the mobile game.

BRIEF DESCRIPTION OF THE DRAWINGS

To describe the technical solutions in the embodiments of the present invention or the prior art more clearly, the following briefly introduces the accompanying drawings required for describing the embodiments or the prior art. Apparently, the accompanying drawings in the following description show only some embodiments of the present invention, and a person skilled in the art may derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are some of the embodiments of the present invention rather than all of the embodiments. All other embodiments obtained by a person skilled in the art based on the embodiments of the present invention without creative efforts shall fall within the protection scope of the present disclosure.

The client involved in the embodiments of the present invention may be a game client run on a user equipment which includes, but is not limited to, mobile phones, mobile computers, tablet computers, Personal Digital Assistants (PDAs), media players, smart TVs, smart watches, smart glasses, and smart bracelets.

Figure 1:
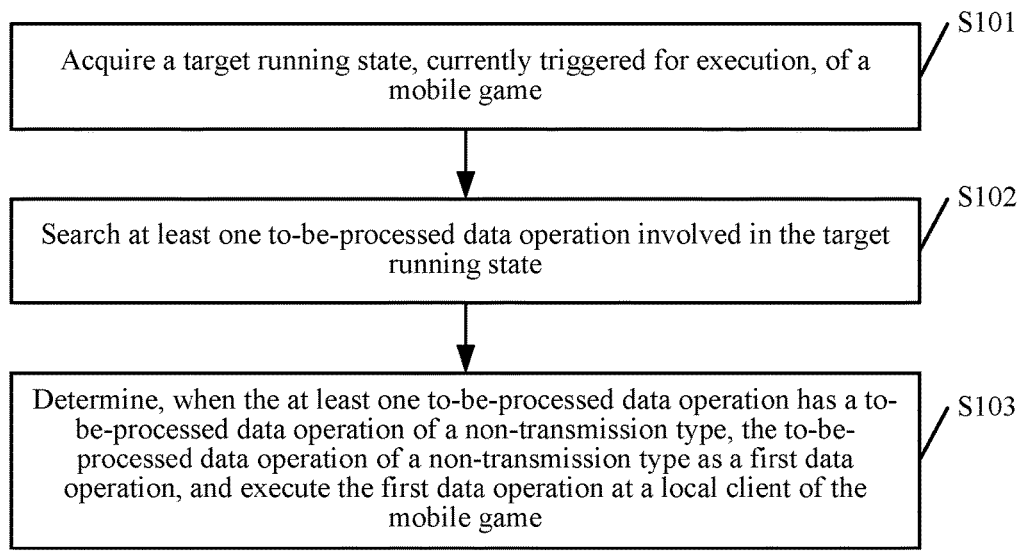
FIG. 1 is a schematic flowchart of a mobile game data processing method according to an embodiment of the present invention.

Referring to FIG. 1, FIG. 1 is a schematic flowchart of a mobile game data processing method according to an embodiment of the present invention. The method may include the following steps.

S101. Acquire a target running state, currently triggered for execution, of a mobile game.

Specifically, a mobile game data processing apparatus applied to a client may acquire a target running state, currently triggered for execution, of a mobile game through a preset state machine. The target running state may be one of at least one running state preset according to a rule of the mobile game. By taking a card game as an example, the preset at least one running state may include an active playing initial state, a passive playing initial state, a selection state, a skill starting state, a playing state, and so on.

The state machine may be a Mealy state machine in a Finite State Machine (FSM), that is, the state machine may be a directed graph, and consists of a group of nodes and a group of corresponding transfer functions. The state machine "runs" by responding to a series of events. Each event is within a control range of transfer functions belonging to "current" nodes. The range of the functions is a subset of the nodes. At least one of the nodes has to be in a final state, and when reaching the final state, the state machine stops.

S102. Search at least one to-be-processed data operation involved in the target running state.

Specifically, after acquiring the target running state, the data processing apparatus may search at least one to-be-processed data operation involved in the target running state. When presetting the at least one running state, the data processing apparatus may also set at least one to-be-processed data operation for each running state. Types of the to-be-processed data operations may be divided into a non-transmission type and a transmission type. The to-be-processed data operations of the non-transmission type specifically refer to data operations that can be judged and executed by the client itself without exchanging data with the server, and the to-be-processed data operations of the transmission type specifically refer to data operations that need to exchange data with the server. Still by taking the card game as an example, at least one to-be-processed data operation involved in the active playing initial state may include: "notify a User Interface (UI) to display a playing progress bar"; and at least one to-be-processed data operation involved in the passive playing initial state may include: "notify the UI to display playing animation", and "send game data corresponding to a playing process to the server". "Notify a UI to display a playing progress bar" and "notify the UI to display playing animation" are both to-be-processed data operations of the non-transmission type, and "send game data corresponding to a playing process to the server" is a to-be-processed data operation of the transmission type. The active playing initial state may be triggered for execution by the server by sending trigger information. The trigger information is generated when the server detects that it is the client's turn to enter an active playing round; and the playing state may be triggered for execution by the client according to a playing click operation of a user.

S103. Determine, when the at least one to-be-processed data operation has a to-be-processed data operation of a non-transmission type, the to-be-processed data operation of a non-transmission type as a first data operation, and execute the first data operation at a local client of the mobile game.

Specifically, when the data processing apparatus detects that the at least one to-be-processed data operation has a to-be-processed data operation of a non-transmission type, it indicates that there is a to-be-processed data operation, which can be judged by the client itself without exchanging data with the server, in the target running state. Therefore, the data processing apparatus can determine the to-be-processed data operation of the non-transmission type as a first data operation, and execute the first data operation at a local client of the mobile game. The first data operation includes an operation of displaying interface association information. The interface association information includes at least one of progress information, associated animation information, and operation result information. For example, if a currently acquired target running state is an active playing initial state, it can be detected that the to-be-processed data operation "notify a UI to display a playing progress bar" involved in the active playing initial state belongs to a non-transmission type. Therefore, the data processing apparatus can actively notify the UI to display a playing progress bar, that is, the data processing apparatus can perform an operation of displaying progress information. As it is unnecessary to send, by the server, a notification message to the client to notify the client to display a playing progress bar, redundant information exchange can be reduced.

Optionally, the first data operation may further include local logic operations without data exchange. The local logic operations specifically refer to logic operations that can be executed at the local client and do not need to be processed and notified by the server. By taking a card game as an example, when a user clicks to select a card in the local client, the data processing apparatus can acquire that a current target running state is a selection state. Therefore, the data processing apparatus can execute a local logic operation involved in the selection state at the local client. The local logic operation is specifically: analyzing, according to an attack distance of the card and a character distance between a character role of the local client and a character role of another client, a character role that may be attacked by the card, and graying an avatar of a character role that cannot be attacked by the card. As the server neither needs to send analyzed character attack distance association information to the local client nor needs to notify the local client to gray the avatar of the character role, the number of times of information exchange may be reduced effectively.

Optionally, when the at least one to-be-processed data operation has a to-be-processed data operation of a transmission type, the to-be-processed data operation of a transmission type is determined as a second data operation, and the second data operation is executed through data transmission with a server. The second data operation refers to an operation of transmitting game data between the client and the server, which may be specifically divided into an operation of receiving game data and an operation of sending game data.

Figure 1A:
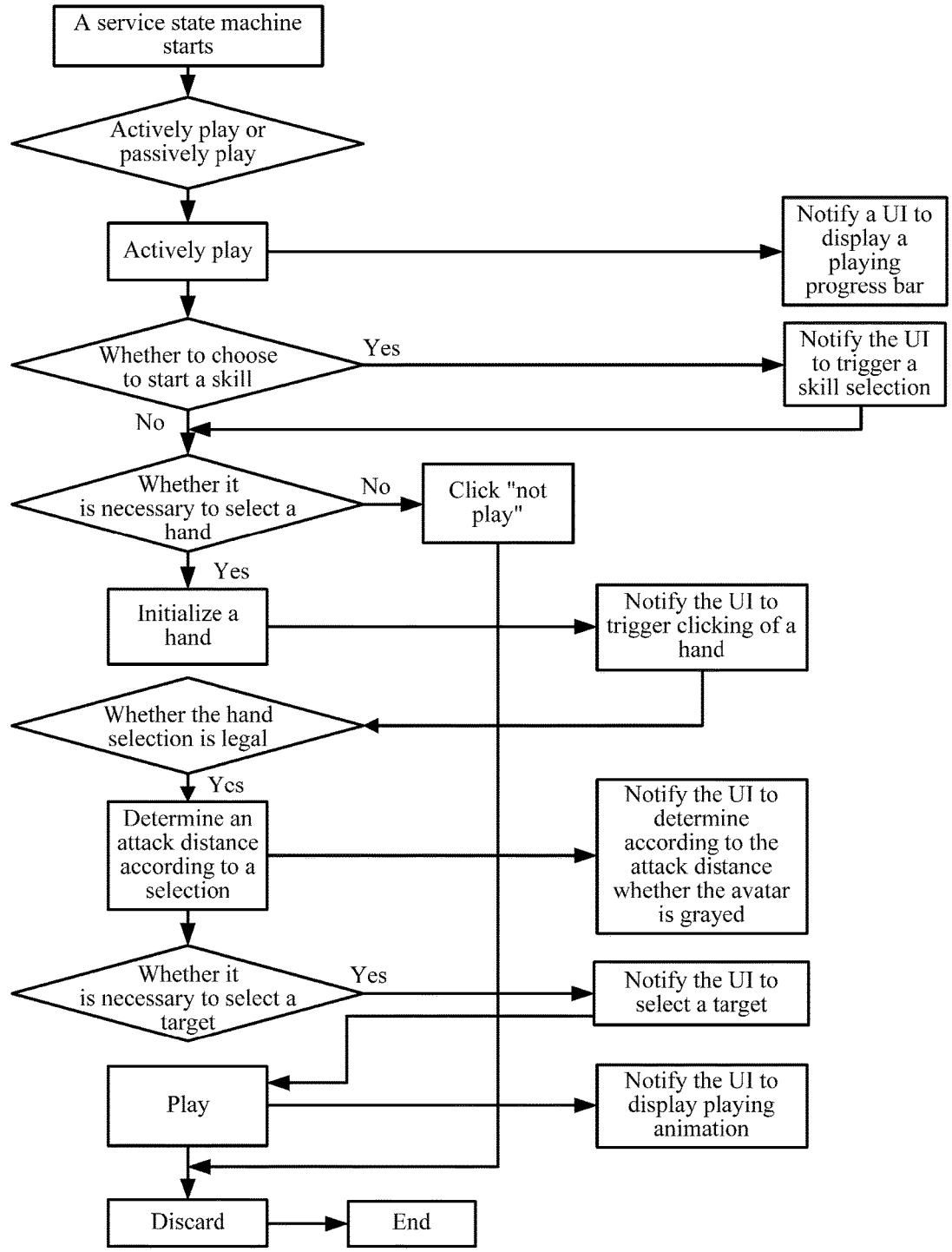
FIG. 1a is a schematic flowchart of a monitoring process of a state machine according to an embodiment of the present invention.

Referring to FIG. 1a, FIG. 1a is a schematic flowchart of a monitoring process of a state machine according to an embodiment of the present invention. The state machine in FIG. 1a is applied to card games, and the state machine shown in FIG. 1a specifically takes an active playing process as an example. After the state machine in FIG. 1a begins execution, the state machine can detect, in real time, whether a client enters an active playing stage or a passive playing stage, if detecting that the client enters an active playing stage, the state machine can determine that the current target running state is an active playing initial state, and if detecting that the client enters a passive playing stage, the state machine can determine that the current target running state is a passive playing initial state. After the state machine determines that the current target running state is an active playing initial state, the data processing apparatus can actively execute a first data operation ("notify a UI to display a playing progress bar") involved in the active playing initial state; the state machine continues to detect whether the user starts a skill, and when the user clicks to select a key, the state machine can jump the current target running state to a skill selection state, so that the data processing apparatus can actively execute a first data operation ("notify the UI to trigger a skill selection") involved in the skill selection state; when the user chooses not to start a skill, the state machine continues to detect whether the user selects a hand, and if the user clicks a hand, the state machine can jump the current target running state to a selection state, so that the data processing apparatus can actively execute multiple first data operations ("initialize a hand", "notify the UI to trigger clicking of a hand", "judge whether a hand selection is legal", "determine an attack distance according to the selection", and "notify the UI to determine whether the avatar is grayed according to the attack distance") involved in the selection state; the state machine continues to detect whether the user selects a target (the target may be a character role of another client or a hand of another client), and if the user clicks to select a target, the state machine jumps the current running state to a target selection state, so that the data processing apparatus can actively execute a first data operation ("notify the UI to select a target") involved in the target selection state; the state machine continues to detect whether the user clicks a playing key, and if the user clicks the playing key, the state machine can jump the current running state to a playing state, so that the data processing apparatus can actively execute a first data operation ("notify the UI to display playing animation") involved in the playing state, and the data processing apparatus can also execute a second data operation ("send game data corresponding to a playing process to the server") involved in the playing state through data exchange with the server. After the state machine detects a discard click operation of the user, the state machine will stop monitoring the state of the round.

The embodiment of the present invention, by acquiring a target running state, currently triggered for execution, of a mobile game and searching at least one to-be-processed data operation involved in the target running state, can determine, when the at least one to-be-processed data operation has a to-be-processed data operation of a non-transmission type, the to-be-processed data operation of a non-transmission type as a first data operation, and execute the first data operation at a local client of the mobile game. It is thus clear that a client may analyze a target running state to judge a current operation that can be executed locally, so that the client can perform a first data operation at a local client without exchanging information with a server, which avoids redundant information exchange, thereby avoiding a waste of network bandwidths, and improves network smoothness of the mobile game.

Figure 2:
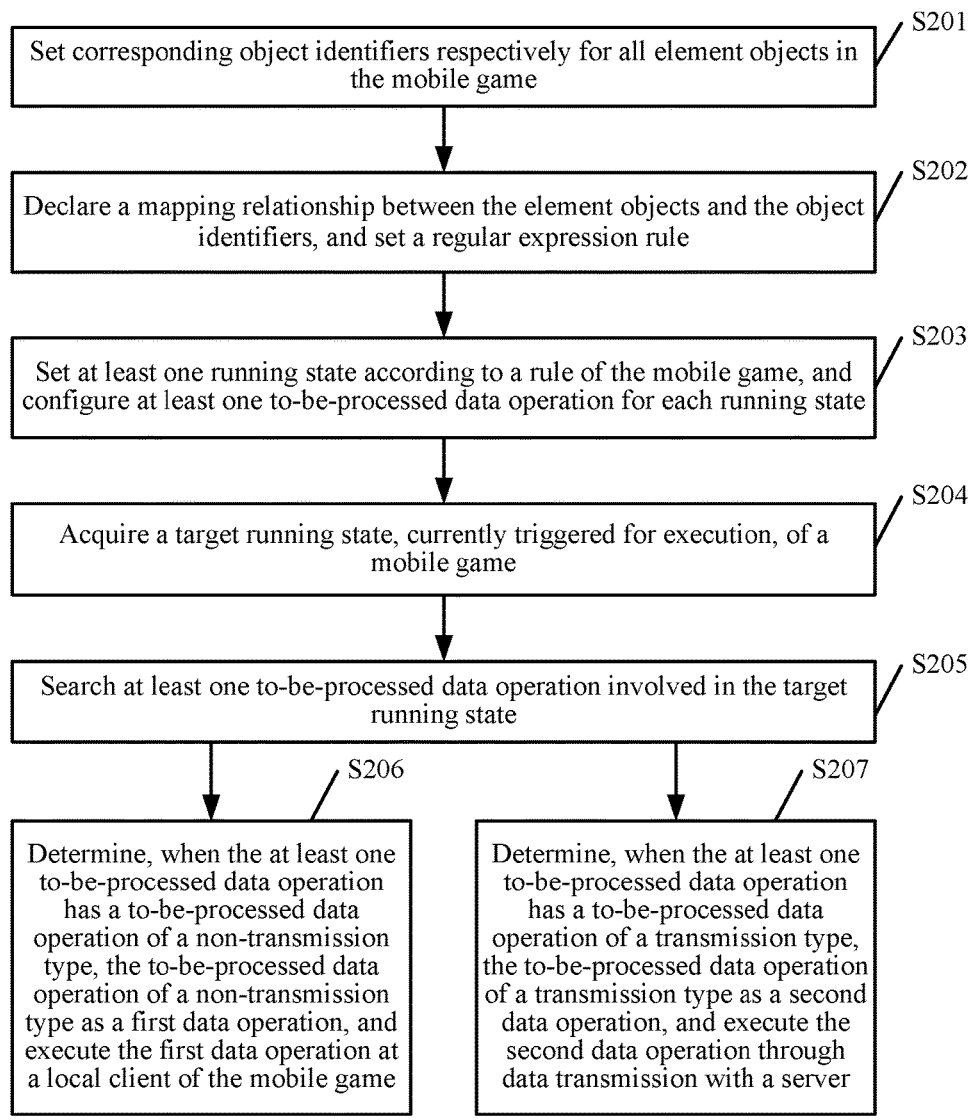
FIG. 2 is a schematic flowchart of another mobile game data processing method according to an embodiment of the present invention.

Referring to FIG. 2, FIG. 2 is a schematic flowchart of another mobile game data processing method according to an embodiment of the present invention. The method may include the following steps.

S201. Set corresponding object identifiers respectively for all element objects in the mobile game.

S202. Declare a mapping relationship between the element objects and the object identifiers, and set a regular expression rule.

Specifically, a mobile game data processing apparatus applied to a client can set corresponding object identifiers respectively for all element objects in the mobile game through a preset skill manager, and declare a mapping relationship between the element objects and the object identifiers, in order that the data processing apparatus can acquire the object identifiers corresponding to the element objects or parse the element objects corresponding to the object identifiers according to the declared mapping relationship. A specific manner of declaring the mapping relationship is: declaring a mapping relationship between the element objects and the object identifiers by precompiled template specialization, to make automatic skill creation possible.

Taking a game card as an example, the element objects may include card content, skill content, game character roles, and so on. During an actual application, a specific process of setting, by the skill manager, object identifiers and declaring a mapping relationship may be divided into three parts, for example:

In step one, a skill ID and an attack distance are defined in a CSkilldata.h file

```
enum EskillId
{
//ordinary card
SkillId_sha            = 1,  //sha
SkillId_shan           = 2,  //shan
SkillId_yao            = 3,  //yao
//equipment card
SkillId_ChiTuMa        = 11,   //OffensiveHorse: ChiTuMa
//tip card
SkillId_WuZhongShengYou    = 103,   //WuZhongShengYou
//hero skill
SkillId_TianLang       =203,   //TianLang
};
enum EskillDist
{
SkillDist_PanLongGun       =3,   //PanLongGun
SkillDist_BaWangGong       =5,   //BaWangGong
SkillDist_YuChangJian      =2,   //YuChangJian
SkillDist_LongLinDao       =2,   //LongLinDao
SkillDist_Sha          =1,   //Sha
SkillDist_HuFu         =1,   //HuFu
SkillDist_OffensiveHorse       =-1,   //OffensiveHorse
SkillDist_DefensiveHorse       =+1,   //DefensiveHorse
SkillDist_Default      =1,   //Default
SkillDist_InvalidDistance      = InvalidDistance,   //InvalidDistance
};
```

In step two, a skill sequence is generated in the CSkill-data.h file (i.e., object identifiers and attack distances of element objects are associated by setting class names)

```
        const SKILL_DATA s_SkillData[ ]=
        {
        //ordinary card---initial data
        { SkillId_sha ,"ShaLogic", SkillDist_Sha},
        { SkillId_shan , "ShanLogic", SkillDist_InvalidDistance },
        { SkillId_yao , "YaoLogic", SkillDist_InvalidDistance },
        { SkillId_qipai , "QiPai", SkillDist_Default },
        //equipment card---initial data
        { SkillId_ChiTuMa, "OffensiveHorse Logic", SkillDist_OffensiveHorse },
        //hero card---initial data
        { SkillId_TianLang, "TianLang Logic", SkillDist_Default },
        //tip card---initial data
        { SkillId_WuZhongShengYou, "WuZhongShengYouLogic", SkillDist_
InvalidDistance },
        };
```

In step three, a declaration of a skill constructor template class is added to SkillCreatorFactory.h. As the class of the element objects set includes a mapping relationship between the element objects and the object identifiers, a mapping relationship between the element objects and attack distances, and a mapping relationship between the object identifiers and the attack distances of the element objects, after the class of the element objects are declared, each mapping relationship corresponding to a class name can be acquired during invocation of the class name, so that the client can acquire an object identifier and an attack distance of an element object by invoking a class name of the element object.

After declaring each class name, the skill manager can be further configured to manage life cycles of the element objects. That is, the skill manager can supervise all cards owned by the client during a game, and the supervision includes at least one of creation, logic, and deletion. For example, if the client acquires a new card, the skill manager can create an operation parameter of the card (the operation parameter includes an object identifier and an attack distance acquired according to a class name of the card), and when the card is transferred from a hand area to an equipment area, logic processing can be performed on the card correspondingly (the logic processing is specifically adjusting a state of an area where the card is located); and when the card is played or discarded, the card can be deleted, that is, the skill manager no longer supervises the card.

The data processing apparatus, after setting object identifier and declaring a mapping relationship through the skill manager, may further set a regular expression rule. The regular expression rule may refer to using some predefined specific characters and a combination of the specific characters to form a "regular character string", and the "regular character string" is used to express a filtering logic for the character string.

Taking a card game as an example, the regular expression rule may include a card wildcard rule and an optional target wildcard rule.

The card wildcard rule is:
[card number lower limit flagFromTocard number upper limit, 1:
flag<suit>2:flag<points>3:flag<classId>4.     flag<card place>5: flag<designated card ID aggregation>];
[card wildcard]|[card wildcard]—logic or, one of the two conditions is met;
[card wildcard] &[card wildcard]—logic and, the two conditions are met at the same time;
[card wildcard] % [card wildcard]—an element meeting first wildcard does not participate in next wildcard;

flag: # indicates mutual exclusion; = indicates the same; * indicates any; ! indicates non-inclusion; flagFromTo: - indicates all.

Note: (1) when a ~ limit numerical range is used, an element meeting a current condition does not participate in next condition matching; (2) Non-supported matching mode: when the flag value is = and a flagFromTo value is ~.

The constant includes:

```
---card suit
Suit = {
    Spade = 1, ---Spade
    Club= 2, ---Club
    Heart   = 3, ---Club
    Diamond         = 4, ---Diamond
    InvalidSuit     = 0, ---Invalid
}
---card place
CardPlace = {
    Hand            = 1, ---Hand area
    Equip           = 2, ---Equip area
    Judging         = 3, ---Judging area
    Special         = 4, ---Skill area
    DiscardedPile   = 5, ---DiscardedPile
    DrawPile            = 6, ---DrawPile
    InvalidPlace    = 7, ---InvalidPlace
}
```

Note: (1) when an aggregation identifies a boundary symbol is < > and the interior is empty, it indicates any, not bound by the aggregation. (2) The elements are indexed with constants, and a range of points: 1, 2, 3, 4, 5, 6, 7, 8, 9, 10, 11, 12, 13.

For example, when a logic function corresponding to an element object is designating two cards with different black suits whose ids cannot be 103, an optional card expression corresponding to the logic function can be generated according to the card wildcard rule as: [2-2, 1:#<1, 2>5:!<103>]; or, when a logic function corresponding to an element object is designating two "shan" cards with the same suit, an optional card expression corresponding to the logic function can be generated according to the card wildcard rule as: [2-2, 1:=< >3:=<jinkCard>].

The optional target wildcard rule is:
[target number lower limit flagFromTo target number upper limit, flag<designated target ChairId aggregation>distance]; [target wildcard]|[target wildcard]—indicating logic or, one of the two conditions is met; flag: * does not require user interaction, $ requires user interaction; flagFromTo: - indicates all.

When the distance is a positive number, it indicates a physical distance; when the distance is a negative number, it indicates an attack distance; and when the distance is 0 or not configured, it indicates that there is no distance constraint.

The logic expression corresponding to the logic function of the element object may include an optional card expression and/or an optional target expression. The optional card expression is generated according to the card wildcard rule, and the optional card expression indicates a card range that can be selected by the logic function. The optional target expression is generated according to the optional target wildcard rule, and the optional target expression indicates target character roles that can be selected by the logic function. When a skill is started or a card is played, the data processing apparatus can generate a corresponding operation expression according to game data (the game data includes a user-selected skill or a user-selected card or a user-selected target character role) corresponding to a user operation. The operation expression may include a selected card expression and/or a selected target expression. The selected card expression can be generated according to the card wildcard rule, the selected card expression indicates card information selected by the user, and the selected card expression can also carry an object identifier of a skill selected by the user. The selected target expression can be generated according to the optional target wildcard rule, and the selected target expression indicates a target character role selected by the user.

S203. Set at least one running state according to a rule of the mobile game, and configure at least one to-be-processed data operation for each running state.

Specifically, step S203 and steps S201-S202 are performed not in any particular order, and steps S201-S203 are a preset process. The data processing apparatus may set at least one running state according to a rule of the mobile game, and configure at least one to-be-processed data operation for each running state; wherein the at least one state has at least one target running state sequentially triggered by the local client according to a user operation, or the at least one state has at least one target running state triggered by the server by sending trigger information. By taking a card game as an example, the preset at least one running state may include an active playing initial state, a passive playing initial state, a selection state, a skill starting state, a playing state, and so on. Types of the to-be-processed data operations may be divided into a non-transmission type and a transmission type. The to-be-processed data operations of the non-transmission type specifically refer to data operations that can be judged and executed by the client itself without exchanging data with the server, and the to-be-processed data operations of the transmission type specifically refer to data operations that need to exchange data with the server. Still by taking the card game as an example, at least one to-be-processed data operation involved in the active playing initial state may include: "notify the UI to display a playing progress bar"; and at least one to-be-processed data operation involved in the passive playing initial state may include: "notify the UI to display playing animation", and "send game data corresponding to a playing process to the server". "Notify the UI to display a playing progress bar" and "notify the UI to display playing animation" are both to-be-processed data operations of the non-transmission type, and "send game data corresponding to a playing process to the server" is a to-be-processed data operation of the transmission type. The active playing initial state may be triggered for execution by the server by sending trigger information. The trigger information is generated when the server detects that it is the client's turn to enter an active playing round; and the playing state may be triggered for execution by the client according to a playing click operation of a user.

S204. Acquire a target running state, currently triggered for execution, of a mobile game.

S205. Search at least one to-be-processed data operation involved in the target running state.

S206. Determine, when the at least one to-be-processed data operation has a to-be-processed data operation of a non-transmission type, the to-be-processed data operation of a non-transmission type as a first data operation, and execute the first data operation at a local client of the mobile game.

Reference may be made to S101-S103 in the corresponding embodiment of FIG. 1 for specific implementations of steps S204-S206, which are not further described herein.

S207. Determine, when the at least one to-be-processed data operation has a to-be-processed data operation of a transmission type, the to-be-processed data operation of a transmission type as a second data operation, and execute the second data operation through data transmission with a server; wherein game data transmitted in the second data operation is formed according to a regular expression rule; and the game data includes an operation expression or a logic operation.

Specifically, when the at least one to-be-processed data operation has a to-be-processed data operation of a transmission type, it indicates that a to-be-processed data operation requiring information exchange with the server exists in the target running state. Therefore, the data processing apparatus can determine the to-be-processed data operation of the transmission type as a second data operation, and execute the second data operation through data transmission with a server. The second data operation may be specifically divided into an operation of receiving game data and an operation of sending game data. The game data is formed according to a regular expression rule; and the game data includes an operation expression or a logic operation.

Further, when the at least one to-be-processed data operation has a to-be-processed data operation of a transmission type and it is further detected that the target running state is triggered by the local client according to a user operation, the second data operation can be determined as an operating of sending the game data, and then the specific process of executing the second data operation through data transmission with a server may be: generating an operation expression corresponding to the user operation according to the regular expression rule; the operation expression including an object identifier of a target element object involved in the user operation; and sending the operation expression to the server, so that the server acquires a logical function of the target element object, and sending a logic expression corresponding to the logical function to a target client; the logic expression being formed according to the regular expression rule, and including an object identifier of at least one element object associated with the logical function. By taking a card game as an example, if the user selects a card A and selects a target character role B and clicks to play, the data processing apparatus can generate an operation expression corresponding to the user operation, and send the operation expression to the server. The operation expression may include a selected card expression and a selected target expression. The selected card expression may be generated according to the card wildcard rule, and the selected card expression indicates information of the card A (i.e., an object identifier corresponding to the card A) selected by the user. The selected target expression may be generated according to the optional target wildcard rule, and the selected target expression indicates information of the target character role B (i.e., an object identifier corresponding to the target character role B) selected by the user.

Further, when the at least one to-be-processed data operation has a to-be-processed data operation of a transmission type and it is further detected that the target running state is triggered by the server, the second data operation can be determined as an operation of receiving the game data, and then the specific process of executing the second data operation through data transmission with a server may be: receiving a logic expression corresponding to a logical function of a target element object sent by the server; the logic expression being formed according to the regular expression rule, and including an object identifier of at least one element object associated with the logical function; and parsing the object identifier in the logic wildcard expression, to identify the logical function of the target element object, and executing an operation in line with the logical function. Still by taking the card game as an example, when another client selects a character role of a local client and plays a card A, the server will send to the local client a logic expression corresponding to a logic function of the card A. The logic expression may include an optional card expression. The optional card expression is generated according to the card wildcard rule, and the optional card expression indicates a card range that can be selected by the logic function of the card A. After receiving the logic expression, the local client can parse the optional card expression in the logic expression, to acquire the logic function of the card A, so that the local client can select valid cards according to the card range that can be selected by the logic function of the card A. For another example, if the optional card expression corresponding to the logic function of the card A is [2-2, 1:#<1, 2>5:!<103>], the data processing apparatus can analyze according to the card wildcard rule that "2-2" refers to selecting two cards, "1:#<1, 2>" refers to selecting cards with different black suits, and "5:!<103>" refers to that the selected cards cannot be numbered as 103, thus obtaining that the card range that can be selected by the logic function of the card A is "designate two cards with different black suits which cannot be numbered as 103".

The data process apparatus in the embodiment of the present invention is a derivative system module developed based on cocos2d-x-UFO. The cocos2d-x-UFO fuses excellent characteristics of cocos2d-x (open-source mobile 2D game framework) on the basis of a UFO engine, and mutually fuses excellent functional modules such as bone animation, particle effects, FBO Off-Screen Rendering, Shader (renderer), motion assembler, Scud, and incremental upgrade modules. The cocos2d-x-UFO is cross-platform, and can cover platforms such as iOS, Android, Symbian, Win32, WP7, Bada, and iMac. The data exchange between the server and each client is transmission based on the operation expression or the logic expression, the operation expression and the logic expression are both formed by preset object identifiers, and the object identifiers are universal, that is, clients of various platforms can identify the object identifiers. Therefore, implementability of cross-platform integration is further improved. Moreover, as the operation expression and the logic expression occupy a relatively small capacity, transmitting the operation expression or the logic expression can save network packet traffic. As all the cards, skills, and heroes are set as object identifiers, when a new element object is added, an adaptive effect of the new element object may be achieved only by configuring an object identifier of the new element object in the client and the server and configuring a logic expression corresponding to a logic function of the new element object in the server, thereby avoiding lots of changes in a replication relationship between the new element object and existing element objects in the client, thus significantly reducing human costs of the project and shortening the development cycle of skills.

Optionally, the data processing apparatus can also preset a relationship listening queue based on a Model View Controller (MVC) model, the relationship listening queue including mapping relationships between the at least one running state and all interface association information and between all the element objects and all interface association information in the mobile game; one running state corresponding to one piece of interface association information, and one element object corresponding to one piece of interface association information. The data processing apparatus can gather the at least one running state and all the element objects in one component through the MVC model, to be separated from all the interface association information, so that when the interface association information is modified, it is unnecessary to rewrite the at least one running state and all the element objects and it is only necessary to modify the mapping relationship in the relationship listening queue. Therefore, the step of executing the first data operation at a local client of the mobile game may specifically include: acquiring, according to the preset relationship listening queue, interface association information having a mapping relationship with the target running state and/or interface association information having a mapping relationship with a target element object, and displaying the acquired interface association information in a user interface of the local client; the target element object being an element object triggered in the target running state (i.e., an element object operated by the user).

Specifically, the data processing apparatus can create Observer interfaces and Observable classes. As one mapping relationship (referring to a mapping relationship between one running state and one piece of interface association information or referring to a mapping relationship between one element object and one piece of interface association information) corresponds to one Observer interface, mapping relationships between the at least one running state and all interface association information and between all the element objects and all interface association information in the mobile game can all be registered in a relationship listening queue of the Observable classes, that is, all the Observer interfaces are registered in the relationship listening queue of the Observable classes.

The embodiment of the present invention, by acquiring a target running state, currently triggered for execution, of a mobile game and searching at least one to-be-processed data operation involved in the target running state, can determine, when the at least one to-be-processed data operation has a to-be-processed data operation of a non-transmission type, the to-be-processed data operation of a non-transmission type as a first data operation, and execute the first data operation at a local client of the mobile game. It is thus clear that a client may analyze a target running state to judge a current operation that can be executed locally, so that the client can perform a first data operation at a local client without exchanging information with a server, which avoids redundant information exchange, thereby avoiding a waste of network bandwidths, and improves network smoothness of the mobile game. Moreover, the data exchange between the server and each client is transmission based on the operation expression or the logic expression, the operation expression and the logic expression are both formed by preset object identifiers, and the object identifiers are universal, that is, clients of various platforms can identify the object identifiers. Therefore, implementability of cross-platform integration is further improved. Moreover, as the operation expression and the logic expression occupy a relatively small capacity, transmitting the operation expression or the logic expression can save network packet traffic. As all the cards, skills, and heroes are set as object identifiers, when a new element object is added, an adaptive effect of the new element object may be achieved only by configuring an object identifier of the new element object in the client and the server and configuring a logic expression corresponding to a logic function of the new element object in the server, thereby avoiding lots of changes in a replication relationship between the new element object and existing element objects in the client, thus significantly reducing human costs of the project and shortening the development cycle of skills. Besides, the coupling degree can be greatly reduced by gathering the at least one running state and all the element objects in one component through the MVC model to be separated from all the interface association information.

Figure 3:
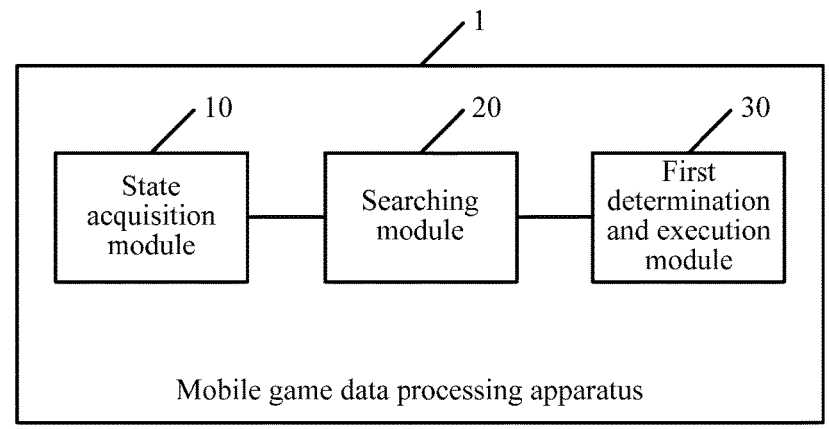
FIG. 3 is a schematic structural diagram of a mobile game data processing apparatus according to an embodiment of the present invention.

Referring to FIG. 3, FIG. 3 is a schematic structural diagram of a mobile game data processing apparatus according to an embodiment of the present invention. The data processing apparatus 1 may be applied to a client, and the data processing apparatus 1 may include: a state acquisition module 10, a searching module 20, and a first determination and execution module 30.

The state acquisition module 10 is configured to acquire a target running state, currently triggered for execution, of a mobile game.

Specifically, the state acquisition module 10 acquires a target running state, currently triggered for execution, of the mobile game through a preset state machine. The target running state may be one of at least one running state preset according to a rule of the mobile game. By taking a card game as an example, the preset at least one running state may include an active playing initial state, a passive playing initial state, a selection state, a skill starting state, a playing state, and so on.

The state machine may be a Mealy state machine in a FSM, that is, the state machine may be a directed graph, and consists of a group of nodes and a group of corresponding transfer functions. The state machine "runs" by responding to a series of events. Each event is within a control range of transfer functions belonging to "current" nodes. The range of the functions is a subset of the nodes. At least one of the nodes has to be in a final state, and when reaching the final state, the state machine stops.

The searching module 20 is configured to search at least one to-be-processed data operation involved in the target running state.

Specifically, after the state acquisition module 10 acquires the target running state, the searching module 20 can search at least one to-be-processed data operation involved in the target running state. When the at least one running state is preset, at least one to-be-processed data operation may also be set for each running state. Types of the to-be-processed data operations may be divided into a non-transmission type and a transmission type. The to-be-processed data operations of the non-transmission type specifically refer to data operations that can be judged and executed by the client itself without exchanging data with the server, and the to-be-processed data operations of the transmission type specifically refer to data operations that need to exchange data with the server. Still by taking the card game as an example, at least one to-be-processed data operation involved in the active playing initial state may include: "notify a UI to display a playing progress bar"; and at least one to-be-processed data operation involved in the passive playing initial state may include: "notify the UI to display playing animation", and "send game data corresponding to a playing process to the server". "Notify a UI to display a playing progress bar" and "notify the UI to display playing animation" are both to-be-processed data operations of the non-transmission type, and "send game data corresponding to a playing process to the server" is a to-be-processed data operation of the transmission type. The active playing initial state may be triggered for execution by the server by sending trigger information. The trigger information is generated when the server detects that it is the client's turn to enter an active playing round; and the playing state may be triggered for execution by the client according to a playing click operation of a user.

The first determination and execution module 30 is configured to determine, when the at least one to-be-processed data operation has a to-be-processed data operation of a non-transmission type, the to-be-processed data operation of a non-transmission type as a first data operation, and execute the first data operation at a local client of the mobile game.

Specifically, when it is detected that the at least one to-be-processed data operation has a to-be-processed data operation of a non-transmission type, it indicates that there is a to-be-processed data operation, which can be judged by the client itself without exchanging data with the server, in the target running state. Therefore, the first determination and execution module 30 can determine the to-be-processed data operation of the non-transmission type as a first data operation, and execute the first data operation at a local client of the mobile game. The first data operation includes an operation of displaying interface association information. The interface association information includes at least one of progress information, associated animation information, and operation result information. For example, if a currently acquired target running state is an active playing initial state, it can be detected that the to-be-processed data operation "notify a UI to display a playing progress bar" involved in the active playing initial state belongs to a non-transmission type. Therefore, the first determination and execution module 30 can actively notify the UI to display a playing progress bar, that is, the first determination and execution module 30 can perform an operation of displaying progress information. As it is unnecessary to send, by the server, a notification message to the client to notify the client to display a playing progress bar, redundant information exchange can be reduced.

Optionally, the first data operation may further include local logic operations without data exchange. The local logic operations specifically refer to logic operations that can be executed at the local client and do not need to be processed and notified by the server. By taking a card game as an example, when a user clicks to select a card in the local client, the first determination and execution module 30 can acquire that a current target running state is a selection state. Therefore, the data processing apparatus 1 can execute a local logic operation involved in the selection state at the local client. The local logic operation is specifically: analyzing, according to an attack distance of the card and a character distance between a character role of the local client and a character role of another client, a character role that may be attacked by the card, and graying an avatar of a character role that cannot be attacked by the card. As the server neither needs to send analyzed character attack distance association information to the local client nor needs to notify the local client to gray the avatar of the character role, the number of times of information exchange may be reduced effectively.

The embodiment of the present invention, by acquiring a target running state, currently triggered for execution, of a mobile game and searching at least one to-be-processed data operation involved in the target running state, can determine, when the at least one to-be-processed data operation has a to-be-processed data operation of a non-transmission type, the to-be-processed data operation of a non-transmission type as a first data operation, and execute the first data operation at a local client of the mobile game. It is thus clear that a client may analyze a target running state to judge a current operation that can be executed locally, so that the client can perform a first data operation at a local client without exchanging information with a server, which avoids redundant information exchange, thereby avoiding a waste of network bandwidths, and improves network smoothness of the mobile game.

Figure 4:
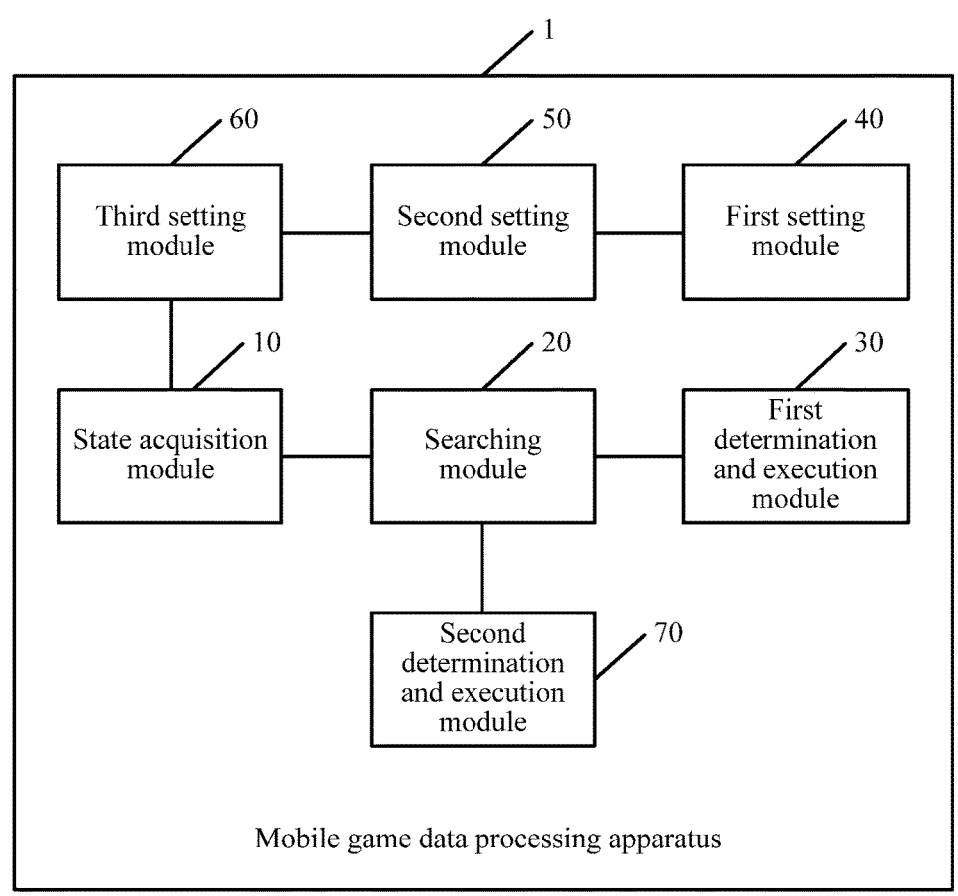
FIG. 4 is a schematic structural diagram of another mobile game data processing apparatus according to an embodiment of the present invention.

Referring to FIG. 4, FIG. 4 is a schematic structural diagram of another mobile game data processing apparatus according to an embodiment of the present invention. The data processing apparatus 1 may be applied to a client. The data processing apparatus 1 may include the state acquisition module 10, the searching module 20, and the first determination and execution module 30 in the corresponding embodiment of FIG. 3, and the data processing apparatus 1 may further include: a first setting module 40, a second setting module 50, a third setting module 60, and a second determination and execution module 70.

The first setting module 40 is configured to set corresponding object identifiers respectively for all element objects in the mobile game.

The first setting module 40 is further configured to declare a mapping relationship between the element objects and the object identifiers, and set a regular expression rule, so that the operation expression is generated or the logic expression is parsed subsequently according to the mapping relationship and the regular expression rule.

Specifically, the first setting module 40 can set corresponding object identifiers respectively for all element objects in the mobile game through a preset skill manager, and declare a mapping relationship between the element objects and the object identifiers, in order that the data processing apparatus 1 can acquire the object identifiers corresponding to the element objects or parse the element objects corresponding to the object identifiers according to the declared mapping relationship. A specific manner of declaring the mapping relationship is: declaring a mapping relationship between the element objects and the object identifiers by precompiled template specialization, to make automatic skill creation possible.

By taking a game card as an example, the element objects may include card content, skill content, game character roles, and so on. During an actual application, a specific process of setting, by the skill manager, object identifiers and declaring a mapping relationship may be divided into three parts, for example:

In step one, a skill ID and an attack distance are defined in a CSkilldata.h file

```
enum EskillId
{
//ordinary card
SkillId_sha      = 1,   //sha
SkillId_shan     = 2,   //shan
SkillId_yao      = 3,   //yao
//equipment card
SkillId_ChiTuMa  = 11,  //Offensive Horse: ChiTuMa
//tip card
```

```
SkillId_WuZhongShengYou     = 103,    //WuZhongShengYou
//hero skill
SkillId_TianLang    = 203,    //TianLang
};
enum EskillDist
{
SkillDist_PanLongGun        =3,    //PanLongGun
SkillDist_BaWangGong        =5,    //BaWangGong
SkillDist_YuChangJian       =2,    //YuChangJian
SkillDist_LongLinDao        =2,    //LongLinDao
SkillDist_Sha           =1,    //Sha
SkillDist_HuFu          =1,    //HuFu
SkillDist_OffensiveHorse        =−1,    //offensive horse
SkillDist_DefensiveHorse        =+1,    //defensive horse
SkillDist_Default       =1,    //default attack distance
SkillDist_InvalidDistance       = InvalidDistance,    //invalid distance
};
```

In step two, a skill sequence is generated in the CSkill-data.h file (i.e., object identifiers and attack distances of element objects are associated by setting class names)

```
const SKILL_DATA s_SkillData[ ]=
{
//ordinary card---initial data
{ SkillId_sha ,"ShaLogic", SkillDist_Sha},
{ SkillId_shan , "ShanLogic", SkillDist_InvalidDistance },
{ SkillId_yao , "YaoLogic", SkillDist_InvalidDistance },
{ SkillId_qipai , "QiPai", SkillDist_Default },
//equipment card---initial data
{ SkillId_ChiTuMa, "OffensiveHorse Logic", SkillDist_OffensiveHorse },
//hero skill---initial data
{ SkillId_TianLang, "TianLang Logic", SkillDist_Default },
//tip card---initial data
{ SkillId_WuZhongShengYou, "WuZhongShengYouLogic", SkillDist_InvalidDistance },
};
```

In step three, a declaration of a skill constructor template class is added to SkillCreatorFactory.h. As the class of the element objects set includes a mapping relationship between the element objects and the object identifiers, a mapping relationship between the element objects and attack distances, and a mapping relationship between the object identifiers and the attack distances of the element objects, after the class of the element objects are declared, each mapping relationship corresponding to a class name can be acquired during invocation of the class name, so that the data processing apparatus 1 can acquire an object identifier and an attack distance of an element object by invoking a class name of the element object.

After declaring each class name, the skill manager can be further configured to manage life cycles of the element objects, that is, the skill manager can supervise all cards owned by the client during a game, and the supervision includes at least one of creation, logic, and deletion. For example, if the client acquires a new card, the skill manager can create an operation parameter of the card (the operation parameter includes an object identifier and an attack distance acquired according to a class name of the card), and when the card is transferred from a hand area to an equipment area, logic processing can be performed on the card correspondingly (the logic processing is specifically adjusting a state of an area where the card is located); and when the card is played or discarded, the card can be deleted, that is, the skill manager no longer supervises the card.

The first setting module 40, after setting object identifier and declaring a mapping relationship through the skill manager, may further set a regular expression rule. The regular expression rule may refer to using some predefined specific characters and a combination of the specific characters to form a "regular character string", and the "regular character string" is used to express a filtering logic for the character string.

By taking a card game as an example, the regular expression rule may include a card wildcard rule and an optional target wildcard rule.

The card wildcard rule is:
[card number lower limit flagFromTo card number upper limit, 1:
flag<suit>2:flag<points>3:flag<classId>4.    flag<card place>5: flag<designated card ID aggregation>];
[card wildcard]|[card wildcard]—logic or, one of the two conditions is met;
[card wildcard] &[card wildcard]—logic and, the two conditions are met at the same time;
[card wildcard] % [card wildcard]—an element meeting first wildcard does not participate in next wildcard;
flag: # indicates mutual exclusion; = indicates the same; * indicates any; ! indicates non-inclusion; flagFromTo: - indicates all.
Note: (1) when a ~ limit numerical range is used, an element meeting a current condition does not participate in next condition matching; (2) Non-supported matching mode: when the flag value is = and a flagFromTo value is ~.

The constant includes:

```
---card suit
Suit = {
    Spade = 1,       ---Spade
    Club= 2,         ---Club
    Heart = 3,       ---Heart
    Diamond      = 4, ---Diamond
    InvalidSuit  = 0, ---Invalid
}
---card place
CardPlace = {
    Hand         = 1, ---Hand area
    Equip        = 2, ---Equip area
    Judging      = 3, ---Judging area
    Special      = 4, ---Skill area
    DiscardedPile = 5, ---Discarded pile
    DrawPile         = 6, ---Draw pile
    InvalidPlace = 7, ---Invalid place
}
```

Note: (1) when an aggregation identifies a boundary symbol is < > and the interior is empty, it indicates any, not bound by the aggregation. (2) The elements are indexed with constants, and a range of points: 1, 2, 3, 4, 5, 6, 7, 8, 9, 10, 11, 12, 13.

For example, when a logic function corresponding to an element object is designating two cards with different black suits whose ids cannot be 103, an optional card expression corresponding to the logic function can be generated according to the card wildcard rule as: [2-2, 1:#<1, 2>5:!<103>]; or, when a logic function corresponding to an element object is designating two "shan" cards with the same suit, an optional card expression corresponding to the logic function can be generated according to the card wildcard rule as: [2-2, 1:=< >3:=<jinkCard>].

The optional target wildcard rule is:
[target number lower limit flagFromTo target number upper limit, flag<designated target ChairId aggregation>distance];
[target wildcard]|[target wildcard]—indicating logic or, one of the two conditions is met;
flag: * does not require user interaction, $ requires user interaction; flagFromTo: - indicates all.

When the distance is a positive number, it indicates a physical distance; when the distance is a negative number, it indicates an attack distance; and when the distance is 0 or not configured, it indicates that there is no distance constraint.

The logic expression corresponding to the logic function of the element object may include an optional card expression and/or an optional target expression. The optional card expression is generated according to the card wildcard rule, and the optional card expression indicates a card range that can be selected by the logic function. The optional target expression is generated according to the optional target wildcard rule, and the optional target expression indicates target character roles that can be selected by the logic function. When a skill is started or a card is played, the data processing apparatus 1 can generate a corresponding operation expression according to game data (the game data includes a user-selected skill or a user-selected card or a user-selected target character role) corresponding to a user operation. The operation expression may include a selected card expression and/or a selected target expression. The selected card expression can be generated according to the card wildcard rule, the selected card expression indicates card information selected by the user, and the selected card expression can also carry an object identifier of a skill selected by the user. The selected target expression can be generated according to the optional target wildcard rule, and the selected target expression indicates a target character role selected by the user.

The second setting module 50 is configured to set at least one running state according to a rule of the mobile game, and configure at least one to-be-processed data operation for each running state.

Specifically, execution times of the second setting module 50 and the first setting module 40 may not be in any particular order. The second setting module 50 may set at least one running state according to a rule of the mobile game, and configure at least one to-be-processed data operation for each running state; wherein the at least one state has at least one target running state sequentially triggered by the local client according to a user operation, or the at least one state has at least one target running state triggered by the server by sending trigger information. By taking a card game as an example, the preset at least one running state may include an active playing initial state, a passive playing initial state, a selection state, a skill starting state, a playing state, and so on. Types of the to-be-processed data operations may be divided into a non-transmission type and a transmission type. The to-be-processed data operations of the non-transmission type specifically refer to data operations that can be judged and executed by the client itself without exchanging data with the server, and the to-be-processed data operations of the transmission type specifically refer to data operations that need to exchange data with the server. Still by taking the card game as an example, at least one to-be-processed data operation involved in the active playing initial state may include: "notify the UI to display a playing progress bar"; and at least one to-be-processed data operation involved in the passive playing initial state may include: "notify the UI to display playing animation", and "send game data corresponding to a playing process to the server". "Notify the UI to display a playing progress bar" and "notify the UI to display playing animation" are both to-be-processed data operations of the non-transmission type, and "send game data corresponding to a playing process to the server" is a to-be-processed data operation of the transmission type. The active playing initial state may be triggered for execution by the server by sending trigger information. The trigger information is generated when the server detects that it is the client's turn to enter an active playing round; and the playing state may be triggered for execution by the client according to a playing click operation of a user.

The third setting module 60 is configured to set a relationship listening queue based on a MVC model, the relationship listening queue including mapping relationships between the at least one running state and all interface association information and between all the element objects and all interface association information in the mobile game; one running state corresponding to one piece of interface association information, and one element object corresponding to one piece of interface association information.

The first determination and execution module 30 is specifically configured to acquire, according to the preset relationship listening queue, interface association information having a mapping relationship with the target running state and/or interface association information having a mapping relationship with a target element object, and display the acquired interface association information in a user interface of the local client; the target element object being an element object triggered in the target running state.

Specifically, the third setting module 60 can create Observer interfaces and Observable classes. As one mapping relationship (referring to a mapping relationship between one running state and one piece of interface association information or referring to a mapping relationship between one element object and one piece of interface association information) corresponds to one Observer interface, mapping relationships between the at least one running state and all interface association information and between all the element objects and all interface association information in the mobile game can all be registered in a relationship listening queue of the Observable classes, that is, all the Observer interfaces are registered in the relationship listening queue of the Observable classes. The third setting module 60 can gather the at least one running state and all the element objects in one component through a MVC model, to be separated from all the interface association information, so that when the interface association information is modified, it is unnecessary to rewrite the at least one running state and all the element objects and it is only necessary to modify the mapping relationship in the relationship listening queue.

The second determination and execution module 70 is configured to determine, when the at least one to-be-processed data operation has a to-be-processed data operation of a transmission type, the to-be-processed data operation of a transmission type as a second data operation, and execute the second data operation through data transmission with a server.

Specifically, when the at least one to-be-processed data operation has a to-be-processed data operation of a transmission type, it indicates that a to-be-processed data operation requiring information exchange with the server exists in the target running state. Therefore, the second determination and execution module 70 can determine the to-be-processed data operation of the transmission type as a second data operation, and execute the second data operation through data transmission with a server. The second data operation may be specifically divided into an operation of receiving game data and an operation of sending game data. The game data is formed according to a regular expression rule; and the game data includes an operation expression or a logic operation.

Figure 5:
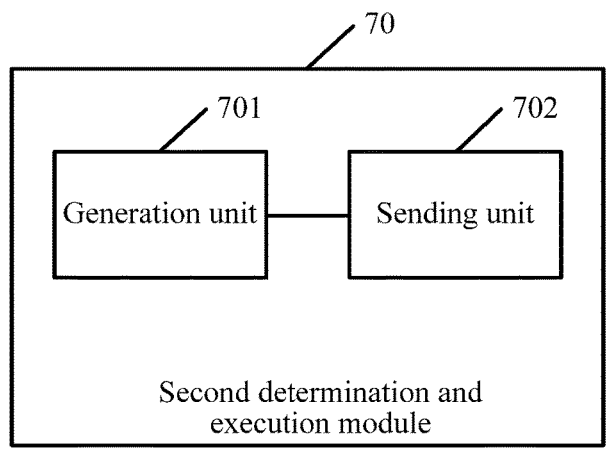
FIG. 5 is a schematic structural diagram of a second determination and execution module according to an embodiment of the present invention.

Further, referring to FIG. 5, FIG. 5 is a schematic structural diagram of a second determination and execution module 70 according to an embodiment of the present invention. The second determination and execution module 70 may include: a generation unit 701 and a sending unit 702.

The generation unit 701 is configured to generate, when the at least one to-be-processed data operation has a to-be-processed data operation of a transmission type and the target running state is triggered by the local client according to a user operation, an operation expression corresponding to the user operation according to the regular expression rule; the operation expression including an object identifier of a target element object involved in the user operation.

The sending unit 702 is configured to send the operation expression to the server, so that the server acquires a logical function of the target element object, and send a logic expression corresponding to the logical function to a target client; the logic expression being formed according to the regular expression rule, and including an object identifier of at least one element object associated with the logical function.

Specifically, when the at least one to-be-processed data operation has a to-be-processed data operation of a transmission type and it is further detected that the target running state is triggered by the local client according to a user operation, the second data operation can be determined as an operating of sending the game data, and then the generation unit 701 may generate an operation expression corresponding to the user operation according to the regular expression rule; and the sending unit 702 sends the operation expression to the server. By taking a card game as an example, if the user selects a card A and selects a target character role B and clicks to play, the generation unit 701 can generate an operation expression corresponding to the user operation, and the sending unit 702 sends the operation expression to the server. The operation expression may include a selected card expression and a selected target expression. The selected card expression may be generated according to the card wildcard rule, and the selected card expression indicates information of the card A (i.e., an object identifier corresponding to the card A) selected by the user. The selected target expression may be generated according to the optional target wildcard rule, and the selected target expression indicates information of the target character role B (i.e., an object identifier corresponding to the target character role B) selected by the user.

Figure 6:
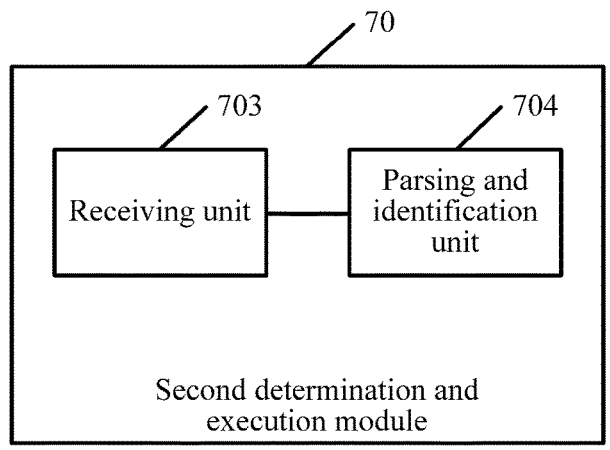
FIG. 6 is a schematic structural diagram of another second determination and execution module according to an embodiment of the present invention.

Further, referring to FIG. 6, FIG. 6 is a schematic structural diagram of another second determination and execution module 70 according to an embodiment of the present invention. The second determination and execution module 70 may include: a receiving unit 703 and a parsing and identification unit 704.

The receiving unit 703 is configured to receive, when the at least one to-be-processed data operation has a to-be-processed data operation of a transmission type and the target running state is triggered by the server, a logic expression corresponding to a logical function of a target element object sent by the server; the logic expression being formed according to the regular expression rule, and including an object identifier of at least one element object associated with the logical function.

The parsing and identification unit 704 is configured to parse the object identifier in the logic wildcard expression, to identify the logical function of the target element object, and execute an operation in line with the logical function.

Specifically, when the at least one to-be-processed data operation has a to-be-processed data operation of a transmission type and it is further detected that the target running state is triggered by the server, the second data operation can be determined as an operation of receiving the game data, and then the receiving unit 703 can receive a logic expression corresponding to a logical function of a target element object sent by the server, and the parsing and identification unit 704 parses the object identifier in the logic wildcard expression, to identify the logical function of the target element object, and executes an operation in line with the logical function. Still by taking the card game as an example, when another client selects a character role of a local client and plays a card A, the server will send to the local client a logic expression corresponding to a logic function of the card A. The logic expression may include an optional card expression. The optional card expression is generated according to the card wildcard rule, and the optional card expression indicates a card range that can be selected by the logic function of the card A. After the receiving unit 703 receives the logic expression, the parsing and identification unit 704 can parse the optional card expression in the logic expression, to acquire the logic function of the card A, so that the local client can select valid cards according to the card range that can be selected by the logic function of the card A. For another example, if the optional card expression corresponding to the logic function of the card A is [2-2, 1:#<1, 2>5:!<103>], the data processing apparatus can analyze according to the card wildcard rule that "2-2" refers to selecting two cards, "1:#<1, 2>" refers to selecting cards with different black suits, and "5:!<103>" refers to that the selected cards cannot be numbered as 103, thus obtaining that the card range that can be selected by the logic function of the card A is "designate two cards with different black suits which cannot be numbered as 103".

The data process apparatus 1 in the embodiment of the present invention is a derivative system module developed based on cocos2d-x-UFO. The cocos2d-x-UFO fuses excellent characteristics of cocos2d-x (open-source mobile 2D game framework) on the basis of a UFO engine, and mutually fuses excellent functional modules such as bone animation, particle effects, FBO Off-Screen Rendering, Shader (renderer), motion assembler, Scud, and incremental upgrade modules. The cocos2d-x-UFO is cross-platform, and can cover platforms such as iOS, Android, Symbian, Win32, WP7, Bada, and iMac.

The embodiment of the present invention, by acquiring a target running state, currently triggered for execution, of a mobile game and searching at least one to-be-processed data operation involved in the target running state, can determine, when the at least one to-be-processed data operation has a to-be-processed data operation of a non-transmission type, the to-be-processed data operation of a non-transmission type as a first data operation, and execute the first data operation at a local client of the mobile game. It is thus clear that a client may analyze a target running state to judge a current operation that can be executed locally, so that the client can perform a first data operation at a local client without exchanging information with a server, which avoids redundant information exchange, thereby avoiding a waste of network bandwidths, and improves network smoothness of the mobile game. Moreover, the data exchange between the server and each client is transmission based on the operation expression or the logic expression, the operation expression and the logic expression are both formed by preset object identifiers, and the object identifiers are universal, that is, clients of various platforms can identify the object identifiers. Therefore, implementability of cross-platform integration is further improved. Moreover, as the operation expression and the logic expression occupy a relatively small capacity, transmitting the operation expression or the logic expression can save network packet traffic. As all the cards, skills, and heroes are set as object identifiers, when a new element object is added, an adaptive effect of the new element object may be achieved only by configuring an object identifier of the new element object in the client and the server and configuring a logic expression corresponding to a logic function of the new element object in the server, thereby avoiding lots of changes in a replication relationship between the new element object and existing element objects in the client, thus significantly reducing human costs of the project and shortening the development cycle of skills. Besides, the coupling degree can be greatly reduced by gathering the at least one running state and all the element objects in one component through the MVC model to be separated from all the interface association information.

Figure 7:
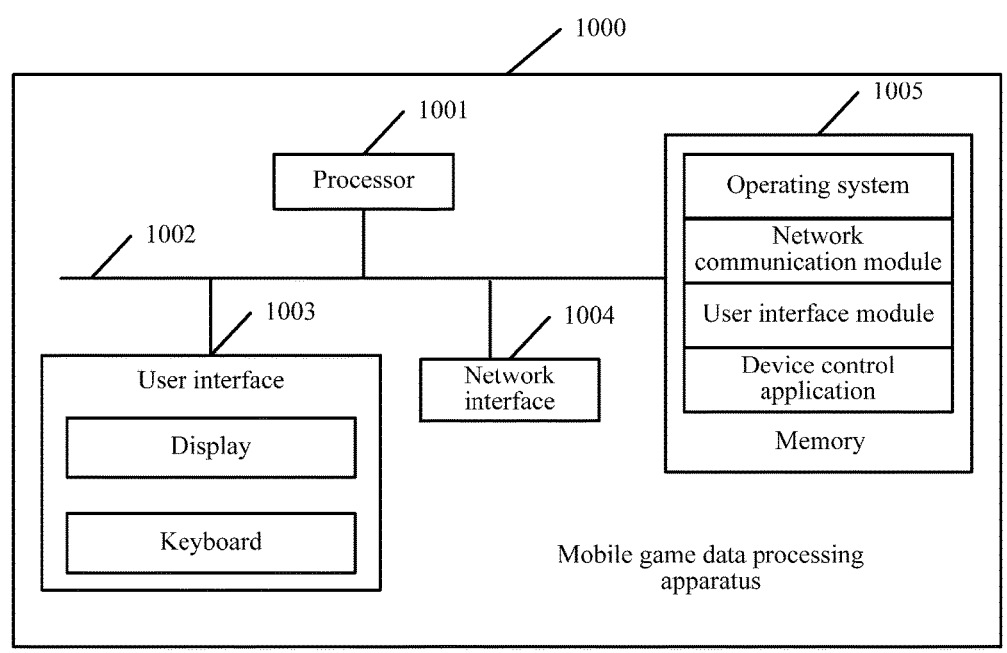
FIG. 7 is a schematic structural diagram of a further mobile game data processing apparatus according to an embodiment of the present invention.

Referring to FIG. 7, FIG. 7 is a schematic structural diagram of a further mobile game data processing apparatus according to an embodiment of the present invention. As shown in FIG. 7, the data processing apparatus 1000 may include: at least one processor 1001, for example, CPU, at least one network interface 1004, a user interface 1003, a memory 1005, and at least one communications bus 1002.

The communications bus 1002 is used to implement connection communications between the components. The user interface 1003 may include a display and a keyboard. Optionally, the user interface 1003 may further include standard wired interfaces and wireless interfaces. Optionally, the network interface 1004 may include standard wired interfaces and wireless interfaces (such as WI-FI interfaces). The memory 1005 may be a high-speed RAM memory, and may also be a non-volatile memory, for example, at least one magnetic disk memory. Optionally, the memory 1005 may further be at least one storage device away from the processor 1001. As shown in FIG. 7, the memory 105 as a computer storage medium may include an operating system, a network communications module, a user interface module, and a device control application.

In the data processing apparatus 1000 shown in FIG. 7, the network interface 1004 is mainly used to connect a server and conduct data communications with the server; the user interface 1003 is mainly used to provide an input interface for the user and acquire data output by the user; the processor 1001 may be used to invoke the device control application stored in the memory 1005, and specifically perform the following steps:

acquiring a target running state, currently triggered for execution, of a mobile game; searching at least one to-be-processed data operation involved in the target running state; and determining, when the at least one to-be-processed data operation has a to-be-processed data operation of a non-transmission type, the to-be-processed data operation of a non-transmission type as a first data operation, and executing the first data operation at a local client of the mobile game;

wherein the first data operation includes a display operation on interface association information, the interface association information including at least one of progress information, associated animation information, and operation result information.

In an embodiment, the processor 1001 also performs the following steps: determining, when the at least one to-be-processed data operation has a to-be-processed data operation of a transmission type, the to-be-processed data operation of a transmission type as a second data operation, and executing the second data operation through data transmission with a server;

wherein game data transmitted in the second data operation is formed according to a regular expression rule; and the game data includes an operation expression or a logic operation.

In an embodiment, the processor 1001, when determining, when the at least one to-be-processed data operation has a to-be-processed data operation of a transmission type, the to-be-processed data operation of a transmission type as a second data operation, and executing the second data operation through data transmission with a server, specifically performs the following steps:

generating, when the at least one to-be-processed data operation has a to-be-processed data operation of a transmission type and the target running state is triggered by the local client according to a user operation, an operation expression corresponding to the user operation according to the regular expression rule; the operation expression including an object identifier of a target element object involved in the user operation; and sending the operation expression to the server, so that the server acquires a logical function of the target element object, and sending a logic expression corresponding to the logical function to a target client; the logic expression being formed according to the regular expression rule, and including an object identifier of at least one element object associated with the logical function.

In an embodiment, the processor 1001, when determining, when the at least one to-be-processed data operation has a to-be-processed data operation of a transmission type, the to-be-processed data operation of a transmission type as a second data operation, and executing the second data operation through data transmission with a server, specifically performs the following steps:

receiving, when the at least one to-be-processed data operation has a to-be-processed data operation of a transmission type and the target running state is triggered by the server, a logic expression corresponding to a logical function of a target element object sent by the server; the logic expression being formed according to the regular expression rule, and including an object identifier of at least one element object associated with the logical function; and parsing the object identifier in the logic wildcard expression, to identify the logical function of the target element object, and executing an operation in line with the logical function.

In an embodiment, before acquiring a target running state, currently triggered for execution, of a mobile game, the processor 1001 further performs the following steps: setting corresponding object identifiers respectively for all element objects in the mobile game; and declaring a mapping relationship between the element objects and the object identifiers, and setting a regular expression rule, so that the operation expression is generated or the logic expression is parsed subsequently according to the mapping relationship and the regular expression rule;

wherein the at least one element object in the target running state is supervised by the local client, the supervision including at least one of creation, logic, and deletion.

In an embodiment, before acquiring a target running state, currently triggered for execution, of a mobile game, the processor 1001 further performs the following step:

setting at least one running state according to a rule of the mobile game, and configuring at least one to-be-processed data operation for each running state;

wherein the at least one state has at least one target running state sequentially triggered by the local client according to a user operation, or the at least one state has at least one target running state triggered by the server by sending trigger information.

In an embodiment, before acquiring a target running state, currently triggered for execution, of a mobile game, the processor 1001 further performs the following step: setting a relationship listening queue based on a MVC model, the relationship listening queue including mapping relationships between the at least one running state and all interface association information and between all the element objects and all interface association information in the mobile game; one running state corresponding to one piece of interface association information, and one element object corresponding to one piece of interface association information; and when executing the first data operation at a local client of the mobile game, the processor 1001 specifically performs the following step:

acquiring, according to the preset relationship listening queue, interface association information having a mapping relationship with the target running state and/or interface association information having a mapping relationship with a target element object, and displaying the acquired interface association information in a user interface of the local client; the target element object being an element object triggered in the target running state.

The embodiment of the present invention, by acquiring a target running state, currently triggered for execution, of a mobile game and searching at least one to-be-processed data operation involved in the target running state, can determine, when the at least one to-be-processed data operation has a to-be-processed data operation of a non-transmission type, the to-be-processed data operation of a non-transmission type as a first data operation, and execute the first data operation at a local client of the mobile game. It is thus clear that a client may analyze a target running state to judge a current operation that can be executed locally, so that the client can perform a first data operation at a local client without exchanging information with a server, which avoids redundant information exchange, thereby avoiding a waste of network bandwidths, and improves network smoothness of the mobile game. Moreover, the data exchange between the server and each client is transmission based on the operation expression or the logic expression, the operation expression and the logic expression are both formed by preset object identifiers, and the object identifiers are universal, that is, clients of various platforms can identify the object identifiers. Therefore, implementability of cross-platform integration is further improved. Moreover, as the operation expression and the logic expression occupy a relatively small capacity, transmitting the operation expression or the logic expression can save network packet traffic. As all the cards, skills, and heroes are set as object identifiers, when a new element object is added, an adaptive effect of the new element object may be achieved only by configuring an object identifier of the new element object in the client and the server and configuring a logic expression corresponding to a logic function of the new element object in the server, thereby avoiding lots of changes in a replication relationship between the new element object and existing element objects in the client, thus significantly reducing human costs of the project and shortening the development cycle of skills. Besides, the coupling degree can be greatly reduced by gathering the at least one running state and all the element objects in one component through the MVC model to be separated from all the interface association information.

According to an implementation of the present disclosure, a non-volatile machine readable storage medium is further provided, which stores a program product for data processing of a mobile game, the program product including a machine executable instruction for causing a computer system to perform the following steps: acquiring a target running state, currently triggered for execution, of a mobile game; searching at least one to-be-processed data operation involved in the target running state; and determining, when the at least one to-be-processed data operation has a to-be-processed data operation of a non-transmission type, the to-be-processed data operation of a non-transmission type as a first data operation, and executing the first data operation at a local client of the mobile game; wherein the first data operation includes a display operation on interface association information, the interface association information including at least one of progress information, associated animation information, and operation result information.

When the at least one to-be-processed data operation has a to-be-processed data operation of a transmission type, the to-be-processed data operation of a transmission type is determined as a second data operation, and the second data operation is executed through data transmission with a server. Game data transmitted in the second data operation is formed according to a regular expression rule; and the game data includes an operation expression or a logic operation.

The determining, when the at least one to-be-processed data operation has a to-be-processed data operation of a transmission type, the to-be-processed data operation of a transmission type as a second data operation, and executing the second data operation through data transmission with a server includes: generating, when the at least one to-be-processed data operation has a to-be-processed data operation of a transmission type and the target running state is triggered by the local client according to a user operation, an operation expression corresponding to the user operation according to the regular expression rule; the operation expression including an object identifier of a target element object involved in the user operation; and sending the operation expression to the server, so that the server acquires a logical function of the target element object, and sending a logic expression corresponding to the logical function to a target client; the logic expression being formed according to the regular expression rule, and including an object identifier of at least one element object associated with the logical function.

The determining, when the at least one to-be-processed data operation has a to-be-processed data operation of a transmission type, the to-be-processed data operation of a transmission type as a second data operation, and executing the second data operation through data transmission with a server includes: receiving, when the at least one to-be-processed data operation has a to-be-processed data operation of a transmission type and the target running state is triggered by the server, a logic expression corresponding to a logical function of a target element object sent by the server; the logic expression being formed according to the regular expression rule, and including an object identifier of at least one element object associated with the logical function; and parsing the object identifier in the logic wildcard expression, to identify the logical function of the target element object, and executing an operation in line with the logical function.

Before the step of acquiring a target running state, currently triggered for execution, of a mobile game, the method further includes:

setting corresponding object identifiers respectively for all element objects in the mobile game; and declaring a mapping relationship between the element objects and the object identifiers, and setting a regular expression rule, so that the operation expression is generated or the logic expression is parsed subsequently according to the mapping relationship and the regular expression rule; wherein the at least one element object in the target running state is supervised by the local client, the supervision including at least one of creation, logic, and deletion.

Before the step of acquiring a target running state, currently triggered for execution, of a mobile game, the method further includes:

setting at least one running state according to a rule of the mobile game, and configuring at least one to-be-processed data operation for each running state; wherein the at least one state has at least one target running state sequentially triggered by the local client according to a user operation, or the at least one state has at least one target running state triggered by the server by sending trigger information.

Before the step of acquiring a target running state, currently triggered for execution, of a mobile game, the method further includes:

setting a relationship listening queue based on a MVC model, the relationship listening queue including mapping relationships between the at least one running state and all interface association information and between all the element objects and all interface association information in the mobile game; one running state corresponding to one piece of interface association information, and one element object corresponding to one piece of interface association information; and the executing the first data operation at a local client of the mobile game specifically including: acquiring, according to the preset relationship listening queue, interface association information having a mapping relationship with the target running state and/or interface association information having a mapping relationship with a target element object, and displaying the acquired interface association information in a user interface of the local client; the target element object being an element object triggered in the target running state.

A person of ordinary skill in the art may understand that all or some of the steps of the methods in the foregoing embodiments may be implemented by a program instructing relevant hardware. The program may be stored in a computer readable storage medium. The program may include the process of the embodiment of the method when executed. The storage medium may be a magnetic disk, an optical disc, a Read-only Memory (ROM), a Random Access Memory (RAM), or the like.

The above disclosed are merely preferred embodiments of the present invention, and definitely cannot be used to limit the scope of the present disclosure. Therefore, equivalent changes made according to the claims of the present disclosure still belong to the scope covered by the present disclosure.

What is claimed is:

1. A mobile game data processing method, applied by a processor coupled with a memory to execute computer executable program code stored in the memory, comprising:
    acquiring a target running state, currently triggered for execution, of a mobile game;
    searching at least one to-be-processed data operation involved in the target running state; and
    determining, when the at least one to-be-processed data operation has a to-be-processed data operation of a non-transmission type, the to-be-processed data operation of a non-transmission type as a first data operation, and executing the first data operation at a local client of the mobile game;
    wherein the first data operation comprises an operation of displaying interface association information, the interface association information comprising at least one of progress information, associated animation information, and operation result information; and
    the local client of the mobile game performs the first data operation at the local client without exchanging information with a server, so as to avoid redundant information exchange between the local client and the server, avoid a waste of network bandwidths and improve network smoothness of the mobile game.

2. The method according to claim 1, further comprising:
    determining, when the at least one to-be-processed data operation has a to-be-processed data operation of a transmission type, the to-be-processed data operation of a transmission type as a second data operation, and executing the second data operation through data transmission with the server;

wherein game data transmitted in the second data operation is formed according to a regular expression rule; and the game data comprises an operation expression or a logic operation.

3. The method according to claim 2, wherein the determining, when the at least one to-be-processed data operation has a to-be-processed data operation of a transmission type, the to-be-processed data operation of a transmission type as a second data operation, and executing the second data operation through data transmission with a server comprises:

generating, when the at least one to-be-processed data operation has a to-be-processed data operation of a transmission type and the target running state is triggered by the local client according to a user operation, an operation expression corresponding to the user operation according to the regular expression rule; the operation expression comprising an object identifier of a target element object involved in the user operation; and sending the operation expression to the server, so that the server acquires a logical function of the target element object, and sending a logic expression corresponding to the logical function to a target client; the logic expression being formed according to the regular expression rule, and comprising an object identifier of at least one element object associated with the logical function.

4. The method according to claim 2, wherein the determining, when the at least one to-be-processed data operation has a to-be-processed data operation of a transmission type, the to-be-processed data operation of a transmission type as a second data operation, and executing the second data operation through data transmission with a server comprises:

receiving, when the at least one to-be-processed data operation has a to-be-processed data operation of a transmission type and the target running state is triggered by the server, a logic expression corresponding to a logical function of a target element object sent by the server; the logic expression being formed according to the regular expression rule, and comprising an object identifier of at least one element object associated with the logical function; and parsing the object identifier in the logic wildcard expression, to identify the logical function of the target element object, and executing an operation in line with the logical function.

5. The method according to claim 3, before the acquiring a target running state, currently triggered for execution, of a mobile game, further comprising:

setting corresponding object identifiers respectively for all element objects in the mobile game; and declaring a mapping relationship between the element objects and the object identifiers, and setting a regular expression rule, so that the operation expression is generated or the logic expression is parsed subsequently according to the mapping relationship and the regular expression rule;

wherein the at least one element object in the target running state is supervised by the local client, the supervision comprising at least one of creation, logic, and deletion.

6. The method according to claim 5, before the acquiring a target running state, currently triggered for execution, of a mobile game, further comprising:

setting at least one running state according to a rule of the mobile game, and configuring at least one to-be-processed data operation for each running state;

wherein the at least one state has at least one target running state sequentially triggered by the local client according to a user operation, or the at least one state has at least one target running state triggered by the server by sending trigger information.

7. The method according to claim 6, before the acquiring a target running state, currently triggered for execution, of a mobile game, further comprising:

setting a relationship listening queue based on an MVC model, the relationship listening queue comprising mapping relationships between the at least one running state and all interface association information and between all the element objects and all interface association information in the mobile game; one running state corresponding to one piece of interface association information, and one element object corresponding to one piece of interface association information; and the executing the first data operation at a local client of the mobile game specifically comprising:

acquiring, according to the preset relationship listening queue, interface association information having a mapping relationship with the target running state and/or interface association information having a mapping relationship with a target element object, and displaying the acquired interface association information in a user interface of the local client; the target element object being an element object triggered in the target running state.

8. A mobile game data processing apparatus, comprising:
a memory that stores computer executable program code; and
a processor configured to execute the computer executable program code in the memory and configured for:

acquiring a target running state, currently triggered for execution, of a mobile game;

searching at least one to-be-processed data operation involved in the target running state; and determining, when the at least one to-be-processed data operation has a to-be-processed data operation of a non-transmission type, the to-be-processed data operation of a non-transmission type as a first data operation, and executing the first data operation at a local client of the mobile game;

wherein the first data operation comprises an operation of displaying interface association information, the interface association information comprising at least one of progress information, associated animation information, and operation result information; and the local client of the mobile game performs the first data operation at the local client without exchanging information with a server, so as to avoid redundant information exchange between the local client and the server, avoid a waste of network bandwidths and improve network smoothness of the mobile game.

9. The mobile game data processing apparatus according to claim 8, wherein the processor is further configured for:

determining, when the at least one to-be-processed data operation has a to-be-processed data operation of a transmission type, the to-be-processed data operation of a transmission type as a second data operation, and executing the second data operation through data transmission with the server;

wherein game data transmitted in the second data operation is formed according to a regular expression rule; and the game data comprises an operation expression or a logic operation.

10. The mobile game data processing apparatus according to claim 9, wherein the determining, when the at least one to-be-processed data operation has a to-be-processed data operation of a transmission type, the to-be-processed data operation of a transmission type as a second data operation, and executing the second data operation through data transmission with a server comprises:
generating, when the at least one to-be-processed data operation has a to-be-processed data operation of a transmission type and the target running state is triggered by the local client according to a user operation, an operation expression corresponding to the user operation according to the regular expression rule; the operation expression comprising an object identifier of a target element object involved in the user operation; and
sending the operation expression to the server, so that the server acquires a logical function of the target element object, and sending a logic expression corresponding to the logical function to a target client; the logic expression being formed according to the regular expression rule, and comprising an object identifier of at least one element object associated with the logical function.

11. The mobile game data processing apparatus according to claim 9, wherein the determining, when the at least one to-be-processed data operation has a to-be-processed data operation of a transmission type, the to-be-processed data operation of a transmission type as a second data operation, and executing the second data operation through data transmission with a server comprises:
receiving, when the at least one to-be-processed data operation has a to-be-processed data operation of a transmission type and the target running state is triggered by the server, a logic expression corresponding to a logical function of a target element object sent by the server; the logic expression being formed according to the regular expression rule, and comprising an object identifier of at least one element object associated with the logical function; and
parsing the object identifier in the logic wildcard expression, to identify the logical function of the target element object, and executing an operation in line with the logical function.

12. The mobile game data processing apparatus according to claim 10, wherein, before acquiring a target running state, currently triggered for execution, of a mobile game, the processor is further configured for:
setting corresponding object identifiers respectively for all element objects in the mobile game; and
declaring a mapping relationship between the element objects and the object identifiers, and setting a regular expression rule, so that the operation expression is generated or the logic expression is parsed subsequently according to the mapping relationship and the regular expression rule;
wherein the at least one element object in the target running state is supervised by the local client, the supervision comprising at least one of creation, logic, and deletion.

13. The mobile game data processing apparatus according to claim 12, wherein, before the step of acquiring a target running state, currently triggered for execution, of a mobile game, the processor is further configured for:
setting at least one running state according to a rule of the mobile game, and configuring at least one to-be-processed data operation for each running state;
wherein the at least one state has at least one target running state sequentially triggered by the local client according to a user operation, or the at least one state has at least one target running state triggered by the server by sending trigger information.

14. A non-transitory computer-readable storage medium, storing computer executable program code for, when executed by a processor, performing a mobile game data processing method, the method comprising:
acquiring a target running state, currently triggered for execution, of a mobile game;
searching at least one to-be-processed data operation involved in the target running state; and
determining, when the at least one to-be-processed data operation has a to-be-processed data operation of a non-transmission type, the to-be-processed data operation of a non-transmission type as a first data operation, and executing the first data operation at a local client of the mobile game;
wherein the first data operation comprises an operation of displaying interface association information, the interface association information comprising at least one of progress information, associated animation information, and operation result information; and
the local client of the mobile game performs the first data operation at the local client without exchanging information with a server, so as to avoid redundant information exchange between the local client and the server, avoid a waste of network bandwidths and improve network smoothness of the mobile game.

15. The non-transitory computer-readable storage medium according to claim 14, the method further comprising:
determining, when the at least one to-be-processed data operation has a to-be-processed data operation of a transmission type, the to-be-processed data operation of a transmission type as a second data operation, and executing the second data operation through data transmission with the server;
wherein game data transmitted in the second data operation is formed according to a regular expression rule; and the game data comprises an operation expression or a logic operation.

16. The non-transitory computer-readable storage medium according to claim 15, wherein the determining, when the at least one to-be-processed data operation has a to-be-processed data operation of a transmission type, the to-be-processed data operation of a transmission type as a second data operation, and executing the second data operation through data transmission with a server comprises:
generating, when the at least one to-be-processed data operation has a to-be-processed data operation of a transmission type and the target running state is triggered by the local client according to a user operation, an operation expression corresponding to the user operation according to the regular expression rule; the operation expression comprising an object identifier of a target element object involved in the user operation; and
sending the operation expression to the server, so that the server acquires a logical function of the target element object, and sending a logic expression corresponding to the logical function to a target client; the logic expression being formed according to the regular expression rule, and comprising an object identifier of at least one element object associated with the logical function.

17. The non-transitory computer-readable storage medium according to claim 15, wherein the determining, when the at least one to-be-processed data operation has a to-be-processed data operation of a transmission type, the to-be-processed data operation of a transmission type as a second data operation, and executing the second data operation through data transmission with a server comprises:
- receiving, when the at least one to-be-processed data operation has a to-be-processed data operation of a transmission type and the target running state is triggered by the server, a logic expression corresponding to a logical function of a target element object sent by the server; the logic expression being formed according to the regular expression rule, and comprising an object identifier of at least one element object associated with the logical function; and
- parsing the object identifier in the logic wildcard expression, to identify the logical function of the target element object, and executing an operation in line with the logical function.

18. The non-transitory computer-readable storage medium according to claim 16, wherein, before the step of acquiring a target running state, currently triggered for execution, of a mobile game, the method further comprises:
- setting corresponding object identifiers respectively for all element objects in the mobile game; and
- declaring a mapping relationship between the element objects and the object identifiers, and setting a regular expression rule, so that the operation expression is generated or the logic expression is parsed subsequently according to the mapping relationship and the regular expression rule;
- wherein the at least one element object in the target running state is supervised by the local client, the supervision comprising at least one of creation, logic, and deletion.

19. The non-transitory computer-readable storage medium according to claim 18, wherein, before the step of acquiring a target running state, currently triggered for execution, of a mobile game, the method further comprises:
- setting at least one running state according to a rule of the mobile game, and configuring at least one to-be-processed data operation for each running state;
- wherein the at least one state has at least one target running state sequentially triggered by the local client according to a user operation, or the at least one state has at least one target running state triggered by the server by sending trigger information.

* * * * *